United States Patent [19]

Edwards et al.

[11] 4,431,872
[45] Feb. 14, 1984

[54] TELECOMMUNICATION RECEIVERS

[75] Inventors: Peter L. Edwards, Eastleigh, England; Barry Ward, LaGaude, France

[73] Assignee: International Business Machines Corp., Armonk, N.Y.

[21] Appl. No.: 373,956

[22] Filed: May 3, 1982

[30] Foreign Application Priority Data

May 15, 1981 [EP] European Pat. Off. ........... 81302158

[51] Int. Cl.³ ......................................... H04M 11/00
[52] U.S. Cl. ............................... 179/84 VF; 179/2 A; 179/2 DP
[58] Field of Search ............... 179/84 VF, 2 A, 2 DP, 179/16 EL, 2 AM

[56] References Cited

U.S. PATENT DOCUMENTS 4,121,053 10/1978 Dick ........................... 179/84 VF X
4,313,038 1/1982 Nilssen et al. ................. 179/84 VF

OTHER PUBLICATIONS

Callahan, Jr., "Integrated DTMF Receiver", IEEE Journal of Solid State Circuits, vol. SC14, No. 1, Feb. 1979, pp. 85-90.
Business Week, "Voice Mail Arrives in the Office", Jun. 9, 1980, pp.80-82.

Primary Examiner—G. Z. Rubinson
Assistant Examiner—James L. Dwyer
Attorney, Agent, or Firm—John B. Frisone

[57] ABSTRACT

A DTMF telecommunication receiver in which an additional DTMF receiver circuit is provided tuned to a particular pair of tones. Detection of the particular tones opens a switch in the audio output line and eliminates crosstalk in the hybrid circuit making detection of further DTMF tones less likely to error.

4 Claims, 5 Drawing Figures

TELECOMMUNICATION RECEIVERS

This invention relates to DTMF telecommunication receivers and particularly to devices which receive and transmit both audio and dual tone multifrequency (DTMF) signals.

The use of DTMF signals for telephone dialing is now well known and so-called push-button telephones are common.

U.S. Pat. No. 4,061,885 describes a digital tone decoder including means for generating a timing signal, zero crossing counter means for generating a decode signal after a predetermined number of zero crossings in response to an incoming time domain signal and for generating a reset signal at a predetermined time after the decode signal is sent to reset said zero crossing counter and to said timing means for generating an output signal at one of a plurality of output terminals corresponding to the frequency of the incoming signal upon receipt of the decode signal from said zero crossing means, said decoder means being reset to an initial state upon receipt of the reset signal.

U.S. Pat. No. 3,760,269 describes a multi-frequency tone detector wherein tone detection is accomplished by timing the interval or period of the input tone signal to determine its frequency. Preferably counting, or timing, is accomplished over more than one period, eight in a preferred embodiment, to reduce the effect of noise. A programmable counter is used, with the count thereof being programmed to establish recognition bandwidth limits. The programmable counter is reset each time it counts to a programmed lower or upper bandwidth limit, thus permitting a smaller counter and less memory and logic than otherwise would be required, to be used.

Receivers for DTMF signals are also described in an article of IEEE Journal of Solid State Circuits, Vol. SC14, No. 1, February 1979, pp. 85-90, "Integrated DTMF Receiver," by M. J. Callahan, Jr.

Present day electronic data processing equipment is now being used in the telecommunication area and the combination of the two technologies has given rise to such developments as videotext. Other developments such as "voice mail" also use the techniques of both data processing and DTMF telecommunication. An article in *Business Week*, June 9, 1980, pp. 80-82, titled "Voice Mail Arrives in the Office," describes the development of the voice mail system.

DTMF signals fall within two frequency bands—a low frequency group (697, 770, 852, 941 Hz) and a high frequency group (1209, 1336, 1447, 1633 Hz). Both frequency groups fall within the normal audio range of frequencies. One consequence of this is that if a push-button telephone is used to generate command signals over lines that are at the same time transmitting audio frequency signals, then correct detection of the DTMF command signals becomes difficult.

DTMF signals are used as command signals in a voice mail system. For example, if a user is receiving a batch of telephone messages, then he may wish to either skip one, or go back and replay a received message. The voice mail system uses a combination of DTMF signals as particular commands for each of these functions. Because it is usual to send audio signals out onto the telephone network through a hybrid circuit which may have −15 dB crosstalk and the incoming DTMF tones may be only −45 dB, then the error-free tone detection presents a problem.

It is an object of the present invention to provide a telecommunication receiver having an improved means for detecting received DTMF signals when the receiver is simultaneously transmitting audio frequency signals.

According to the invention, there is provided a dual tone multi-frequency signal receiver comprising a hybrid circuit for transmitting audio and DTMF signals to and receiving audio and DTMF signals from a telecommunication network, an audio output device for feeding audio signals to the hybrid circuit, a voice protected DTMF receiver for receiving DTMF signals from the hybrid circuit characterized by the receiver including a non-voice protected DTMF receiver tuned to a particular DTMF pair of signals and connected to receive signals from the hybrid circuit and having an output connected to switching means which disconnects the output of the voice output device from the hybrid circuit whenever the particular pair of DTMF signals is received.

In order that the invention may be fully understood, it will now be described by way of example and with reference to the accompanying drawings in which.

Figure 1:
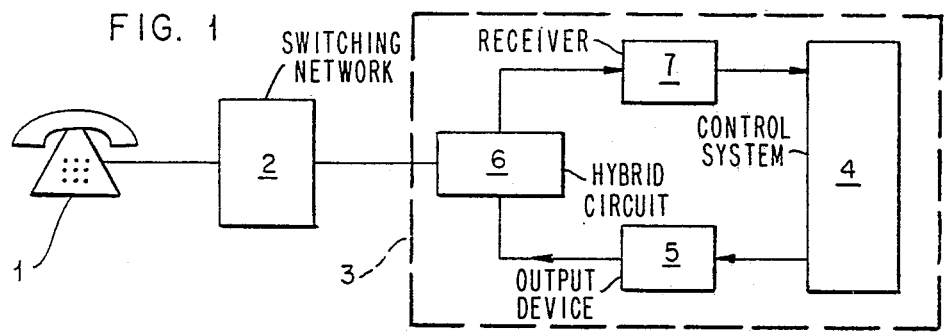
FIG. 1 is a schematic diagram of a voice mail system.

Referring now to FIG. 1, there is shown in schematic form the main components of a voice mail system. A controlling telephone 1—capable of generating DTMF command signals is connected through a public switched network 2 to a voice mail receiving, storing and transmitting system 3. The component parts of the telephone 1 and public switched network 2 are well known and will not be described in further detail.

The system 3 includes a control processing system 4 which provides the processing functions described in the aforementioned *Business Week* article. The audio output from the control system 4 is fed to a voice output device 5 which provides an audio output of 0 dB to a hybrid circuit 6.

The hybrid circuit 6 connects the system 3 to the public switched network. Incoming signals are fed by the hybrid circuit 6 to a voice protected DTMF receiver 7 which decodes the DTMF signals and transmits the command codes to the control processing system 4.

The DTMF signals are generated at the telephone 1 with a tone amplitude of −12 dBm. In the worst case situation, there is a tone loss through the public switched network of −30 dB and the tones arrive at the hybrid circuit 6 with an amplitude of −42 dBm. There is a further loss of −3 dB in the hybrid circuit 6 and the tones arrive at the DTMF receiver 7 at −45 dBm. There is −15 dB crosstalk at the hybrid circuit from the audio output, thus the DTMF receiver has to distinguish −45 dBm DTMF tones from a −15 dBm audio signal.

Figure 2:
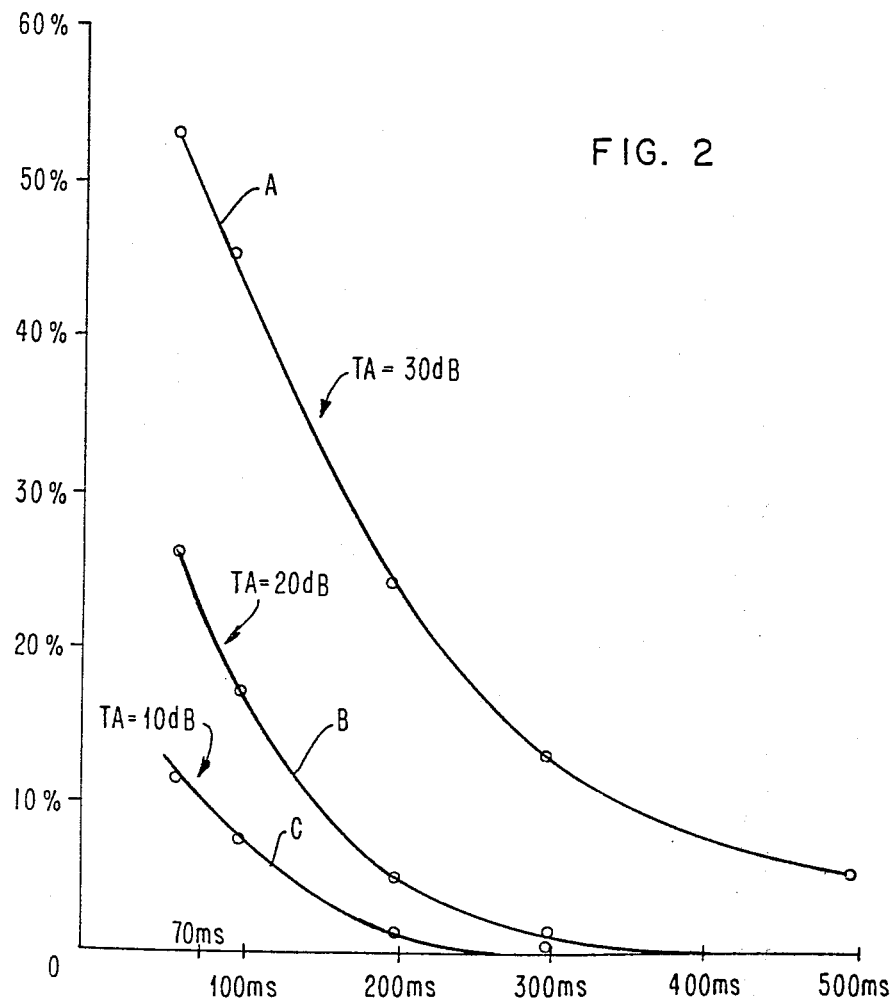
FIG. 2 is a graph showing the voice protected DTMF receiver error rate for tone plus audio input signals.

FIG. 2 is a graph showing three plots of voice protected DTMF receiver error rate for tone plus audio crosstalk input signals. The X axis is tone pulse width in milliseconds (ms). The first width is 70 ms which is the standard proposed to be used by British Telcom. The Y axis is the percentage error rate.

With a tone attenuation of 30 dB, as described above in the FIG. 1 system, the curve A shows a 53% error rate for a tone width of 70 ms. The error rate falls for tones of longer duration, but even at 500 ms there is still a 5% error rate., Curves B and C show plots for tone attenuation of 20 dB and 10 dB respectively, but even curve C shows an error rate of 11% at 70 ms which is not acceptable for normal use of a telephone network and obviously an error rate of 53% is totally unacceptable from a user's point of view.

Figure 3:
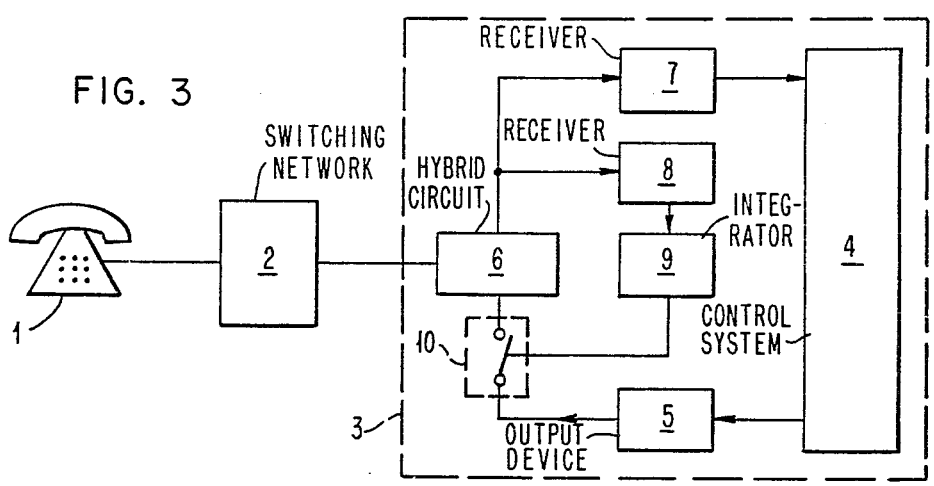
FIG. 3 is a schematic diagram of a first embodiment of a coincident audio DTMF receiver incorporating the invention.

FIG. 3 shows the voice mail system of FIG. 1 incorporating a first embodiment of the present invention. The components 1-7 are the same as those shown in FIG. 1. In addition, a non-voice protected DTMF receiver 8 which is tuned to a particular pair of DTMF tones is connected to receive an input from the hybrid circuit 6. The output of the receiver 8 is passed through an integrater 9 to open a switch 10 interrupting the audio output path between voice output device 5 and the hybrid circuit 6.

In the preferred embodiment, receiver 8 is tuned to the DTMF tones generated when the * button on the push-button telephone 1 is pressed. The * may then be regarded as an "attention" button. When the * DTMF tones are detected by receiver 8, then switch 10 is opened and the audio output to the hybrid circuit interrupted. Crosstalk across the hybrid circuit 6 then ceases and the DTMF receiver 7 will receive the "attention" tones which are then passed to the control processing system 4 will cause the audio output to the voice output device 5 to stop. The processing of the attention command takes an order of microseconds as opposed to the tone width of 70 milliseconds and will be complete before the end of the attention tone and the switch 10 closed.

A command received from the control telephone 1 will cause the control processing system 4 to perform some action such as skipping forward or backward through an audio message file or initiating the speeding up or slowing down of the rate of transmission of audio data. When the control system 4 is ready to start transmitting audio data again, then the switch 10 is closed and the path between voice output device 5 and the hybrid circuit re-established.

Figure 4:
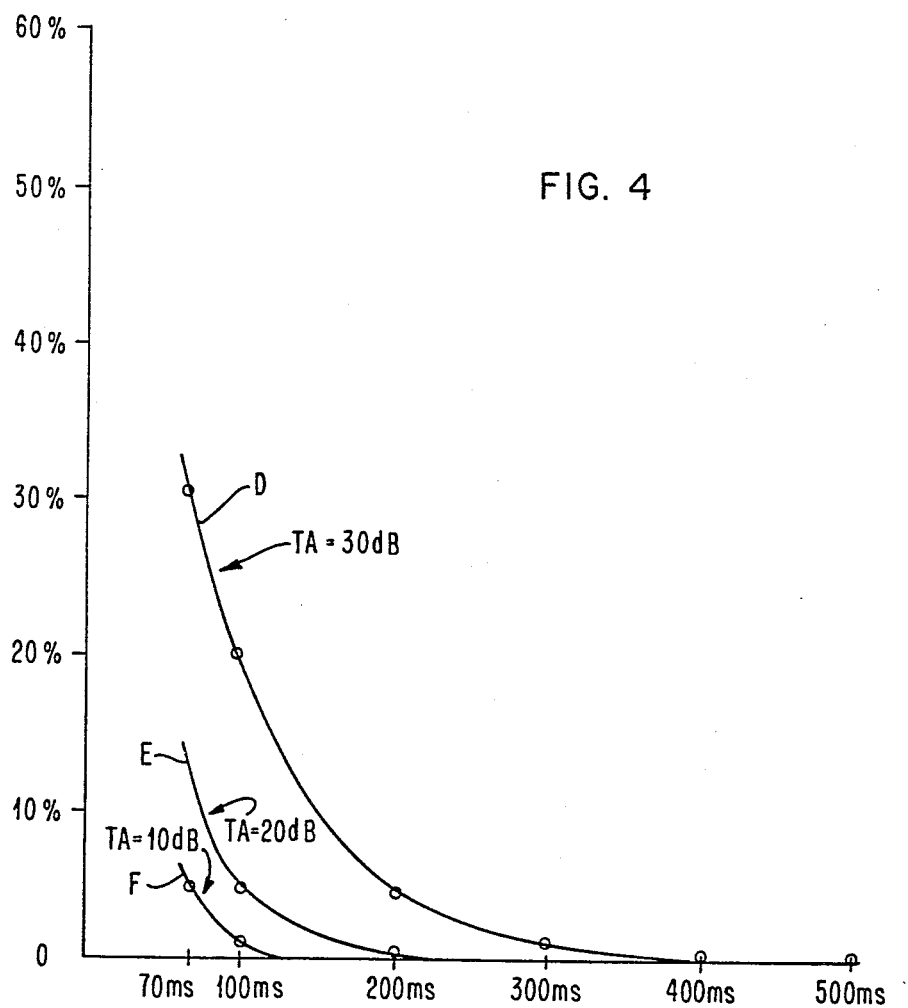
FIG. 4 is a graph showing the coincident audio DTMF receiver error rate for tone plus audio input signals.

FIG. 4 is a graph showing the error rate for the coincident audio DTMF receiver of FIG. 3 on a similar scale to the graph of FIG. 2. Curves D, E and F are for tone attenuation of 30 dB, 20 dB and 10 dB respectively. A 70 ms width tone at 10 dB gives a 5% error rate and even the 30 dB tone attenuation has an error rate of 30%, a considerable improvement over the FIG. 1 system.

Figure 5:
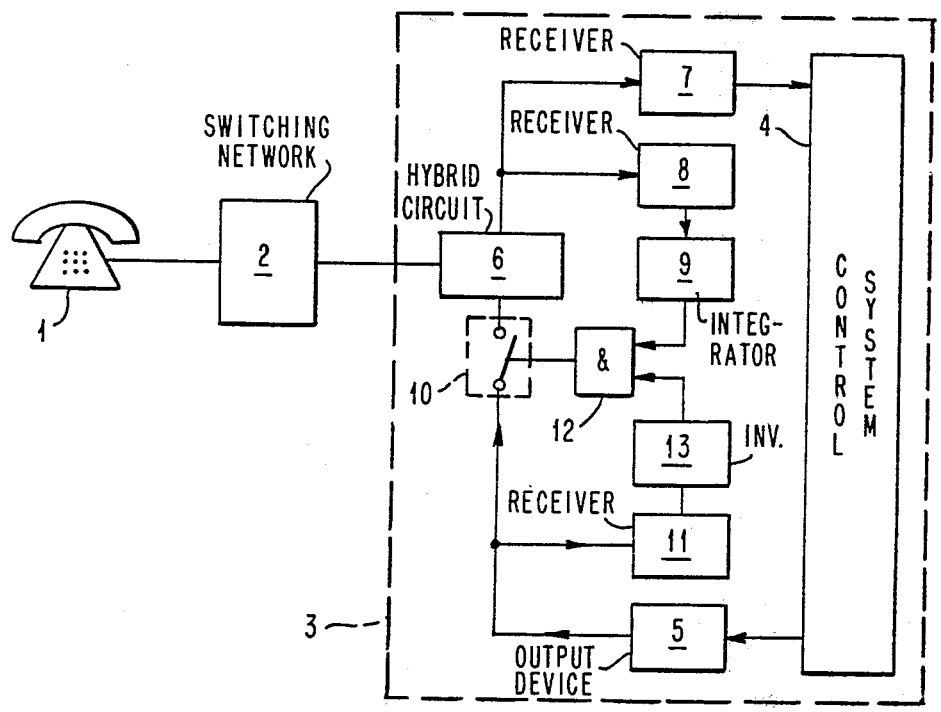
FIG. 5 is a schematic diagram of a second embodiment of the invention.

One problem that can occur with the system of FIG. 3 is that the audio output from the voice output device 5 may produce a signal envelope that through crosstalk on hybrid circuit 6 is detected as the attention DTMF tones by receiver 8. FIG. 5 shows an additional improvement to the system of FIG. 3 to overcome this difficulty.

The components 1-10 of FIG. 5 are the same as those in FIG. 3. The addition is a second non-voice protected DTMF receiver 11 connected to receive the audio output of voice output device 5 and tuned to detect the same pair of attention tones as receiver 8. The output of receiver 11 is connected to an input of AND logic circuit 12 through an inverter circuit 13. The output of integrater 9 is connected to a second input of AND circuit 12 and the output of circuit 12 is connected to switch 10.

If the audio output of voice output device 5 provides a signal that is detected as attention tones by receiver 11, and also by receiver 8, then one input to AND circuit 12 will be up (1) and the other down (0) and there will be no output to operate switch 10. Only if receiver 8 detects the attention tones without receiver 11 detecting them in the audio output, will both inputs of AND circuit 12 be enabled and switch 10 opened.

In the systems of FIGS. 3 and 5 the switch 10 is shown to operate in the line connecting the voice output device 5 to the hybrid circuit 6. This is, of course, for ease of illustration as the switch may be regarded as any means for interrupting the audio output. It may be, for example, preferred that the detected attention tones are sent to the control system 4 which itself would interrupt the output, or the switch 10 may be incorporated in the voice output device 5.

In this description the audio output has been described as voice output; it is, of course, envisaged that the audio output could be other than pure voice, music stores using the voice mail concept have been proposed, and video data is now sent over the public telephone network as a matter of course. The DTMF receiver tuned to the attention tones finds use in all these applications.

The use of the * attention tone may in some systems be optional, when for example, there is little line loss or the user is directly connected to the local exchange. In these cases the chances of detection of DTMF tones by the DTMF receiver 7 are far higher and the * tone need only be used if the detection error rate increases to a level that is unacceptable for the user.

We claim:

1. A dual tone multi-frequency signal receiver comprising a hybrid circuit for transmitting audio and DTMF signals to and receiving audio and DTMF signals from a telecommunication network, an audio output device for feeding audio signals to the hybrid circuit, an audio protected DTMF receiver for receiving DTMF signals from the hybrid circuit characterized by the receiver including a non-audio protected DTMF receiver tuned to a particular DTMF pair of signals and connected to receive signals from the hybrid circuit and having an output connected to switching means which disconnects the output of the audio output device from the hybrid circuit whenever the particular pair of DTMF signals is received.

2. A dual tone multi-frequency signal receiver as claimed in claim 1 including a second non-audio protected DTMF receiver, tuned to the same particular DTMF pair of signals as the first non-audio protected DTMF receiver, connected to receive the audio output of the audio output device and means to inhibit the operation of the switching means whenever the second non-audio protected DTMF receiver detects the particular DTMF pair of signals.

3. A dual tone multi-frequency signal receiver as claimed in claim 1 or claim 2 in which the particular pair of DTMF signals is the combination generated by the * on a push-button receiver.

4. A receiver as claimed in claim 2 in which the output of the first non-audio protected DTMF receiver is connected to the first input of an AND logic circuit, the output of the second non-audio protected DTMF receiver is connected through an inverter circuit to the second input of the AND logic circuit and the output of the said AND logic circuit is connected to the said switch means.

* * * * *